United States Patent [19]

Scaramucci

[11] Patent Number: 4,607,422
[45] Date of Patent: Aug. 26, 1986

[54] METHOD FOR LOCKING A BONNET TO A VALVE BODY

[76] Inventor: John P. Scaramucci, 10724 Woodridden, Oklahoma City, Okla. 73170

[21] Appl. No.: 576,948

[22] Filed: Feb. 3, 1984

Related U.S. Application Data

[62] Division of Ser. No. 334,425, Dec. 24, 1981, Pat. No. 4,452,428.

[51] Int. Cl.⁴ .............. B21D 53/00; B21D 39/03; F16B 39/00; F16B 39/10
[52] U.S. Cl. ............... 29/157.1 R; 29/517; 29/520; 29/521; 29/525; 137/15; 137/315; 137/382; 251/284; 292/253; 403/191; 403/193; 403/234; 403/237; 403/282; 411/91; 411/121; 411/122; 411/123
[58] Field of Search ............ 29/157.1 R, 515, 516, 29/517, 520, 521, 525; 137/15, 315, 382; 251/223, 225, 284, 367; 285/156; 292/253; 403/191, 193, 234, 237, 282; 411/119, 120, 121, 122, 123, 124, 90, 92, 94, 96, 93, 95, 97

[56] References Cited

U.S. PATENT DOCUMENTS

| | | | |
|---|---|---|---|
| 304,271 | 8/1884 | Lunkenheimer | 137/377 |
| 408,320 | 8/1889 | Powell | 411/121 |
| 474,821 | 5/1892 | Edmiston | 411/122 |
| 500,941 | 7/1893 | Perkins | 285/156 X |
| 757,444 | 4/1904 | Entrekin | 301/132 |
| 858,191 | 6/1907 | Logan | 16/DIG. 37 |
| 1,002,774 | 9/1911 | Stouffer | 285/86 |
| 1,251,758 | 1/1918 | Dayton | 251/284 |
| 1,358,496 | 11/1920 | Austin | 411/123 |
| 1,398,681 | 11/1921 | Cooke | 16/DIG. 37 |
| 1,668,223 | 5/1928 | Utman | 137/382 |
| 1,682,188 | 11/1928 | Roose et al. | 137/382 |
| 2,189,654 | 2/1940 | Rief | 411/121 |
| 2,390,838 | 12/1945 | Johnson | 411/119 |
| 2,469,441 | 5/1949 | Pitisci | 411/96 |
| 2,807,388 | 9/1957 | Teeters | 251/367 |
| 3,206,165 | 9/1965 | Salmon et al. | 251/367 |
| 3,254,399 | 6/1966 | Zahuranec | 29/407 |
| 4,050,494 | 9/1977 | de Claire | 411/119 |
| 4,118,007 | 10/1978 | Scapes | 251/223 |

FOREIGN PATENT DOCUMENTS

| | | | |
|---|---|---|---|
| 460595 | 10/1925 | Fed. Rep. of Germany | 411/121 |
| 2903706 | 8/1980 | Fed. Rep. of Germany | 411/97 |
| 950553 | 2/1964 | United Kingdom | |
| 1081784 | 8/1967 | United Kingdom | 411/119 |

OTHER PUBLICATIONS

Drawings, French Document 466,857 of 1914.
Drawings, German Document 221,823 of 1910.

Primary Examiner—Howard N. Goldberg
Assistant Examiner—Ronald S. Wallace
Attorney, Agent, or Firm—Dunlap, Codding & Peterson

[57] ABSTRACT

A bonnet is locked to the body of a valve into which the bonnet screws by a sheet metal bonnet lock which includes a portion that will mate with facets on the bonnet or with the sides of the valve body. Another portion of the bonnet lock is then deformed to mate with the other of the bonnet facets or valve body sides. The portion of the bonnet lock that mates with the facets on the bonnet circumscribes the bonnet such that one portion of the bonnet lock is fixed to the bonnet and the other portion is fixed to the valve body following deformation of the bonnet lock to prevent the bonnet from turning relative to the valve body.

13 Claims, 10 Drawing Figures

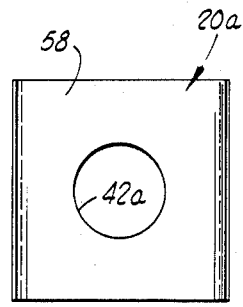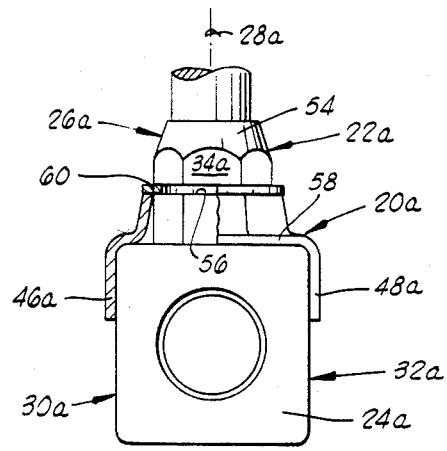
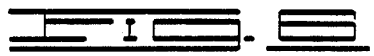 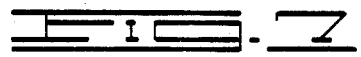
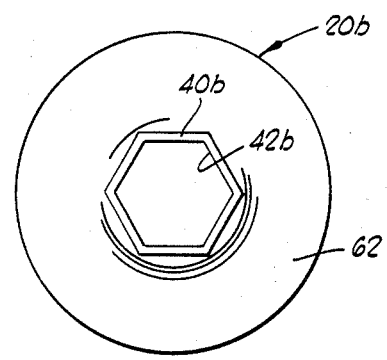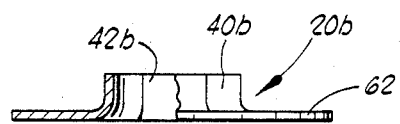
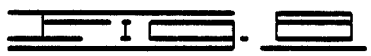 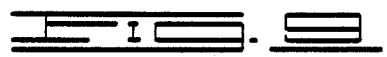
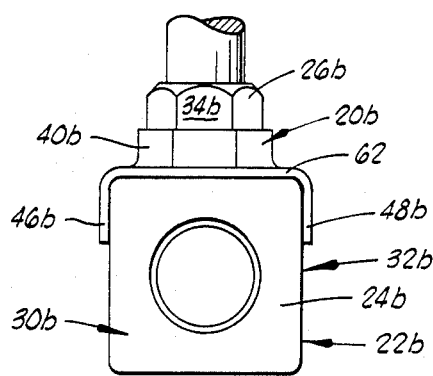
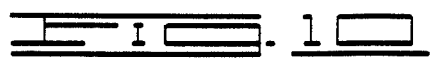

METHOD FOR LOCKING A BONNET TO A VALVE BODY

CROSS REFERENCE TO RELATED APPLICATION

The present U.S. patent application is a divisional application of U.S. patent application Ser. No. 334,425, entitled BONNET LOCKING SYSTEM FOR A VALVE and filed Dec. 24, 1981, now U.S. Pat. No. 4,452,428, issued June 5, 1984.

BACKGROUND OF THE INVENTION

The present invention relates generally to improvements in locking devices and methods and, more particularly, but not by way of limitation, to systems for locking the bonnet of a valve to the body of the valve.

In a common method of valve construction, the body of the valve through which a flow passage is formed, is provided with a threaded well that intersects the surface of the valve and extends into the valve body to cross the flow passage. A bonnet, having a threaded end portion, screws into the well, for a portion of the depth of the well, to form a valve chamber within the body of the valve. In general, the well will be disposed between two opposing sides of the valve and the bonnet will have a plurality of angularly related facets formed on the surface thereof parallel to the screw axis of the bonnet into the valve body, these features providing a means for gripping the bonnet and valve body for screwing the bonnet into the valve body. This mode of valve construction facilitates assembly and repair of the valve in that operating parts of the valve, such parts being disposed within the valve chamber or mounted on the bonnet, are readily accessible when the bonnet is removed from the valve body.

While the above described construction of a valve thus simplifies the manufacture and, should it become necessary, the repair of the valve, it can also give rise to problems. In general, a valve which has been constructed in this manner is opened and closed by turning a valve stem that passes through the bonnet so that, with repeated operation of the valve, the bonnet can work loose in the valve body with the result that the valve will leak. Even worse, the valve stem can become jammed to the bonnet; for example, by the build-up of scale in the valve, so that an inattentive person attempting to open the valve to its maximum flow capacity, might remove the bonnet from the valve.

Because of these problems, bonnet locks have been provided to lock the bonnet into position on the valve body after assembly of the valve. Thus, for example, it is known to form a hole in the valve body at a position that will be adjacent a facet of the bonnet after the valve has been assembled and drive a pin into the hole following the assembly. The pin is fixed to the valve body and engages the facet on the bonnet so that the bonnet is locked into place on the valve body. While pin locking of the bonnet will provide a satisfactory solution to the problems noted above in many circumstances, such mode of locking the bonnet to the valve body can place undesirable limitations on valve manufacture and repair. For example, pin locking depends upon the hole in the valve body being positioned to align with a facet on the bonnet, a condition that is not always consistent with such desirable manufacturing and repair factors as interchangeability of parts and relatively low machining tolerances for such parts. Also, of course, the pin can be difficult to remove, because of its tight engagement with the bonnet, to make it difficult to remove the bonnet for repair purposes.

SUMMARY OF THE INVENTION

The present invention solves these and other problems by providing an inexpensive bonnet lock that can be mounted on a valve to engage the facets of the bonnet and the sides of the valve body for any orientation of the bonnet on the body. To this end, the bonnet lock of the present invention comprises a first locking member which is adapted to engage and mate with surfaces on either the valve body or the bonnet, to fix the bonnet lock with respect to such portion of the valve, and a second locking member which can be deformed to engage surfaces on the other of these two valve parts. An aperture through one of these portions receives the bonnet so that the lock, when mounted on the valve, generally extends about the bonnet and into engagement both with the sides of the valve body and the facets on the valve bonnet.

The bonnet lock of the present invention is manufactured from sheet metal by stamping the lock therefrom so that the lock can be inexpensively replaced each time it becomes necessary to open the valve; for example, for repair, by removing the bonnet from the valve body. Moreover, such construction facilitates the removal of the lock from the valve in that portions of the lock that engage the sides of the valve body can be easily bent away therefrom with simple hand tools to free the bonnet for rotation.

An object of the present invention is to provide a valve bonnet lock which will lock the bonnet of the valve to the valve body for any orientation of the bonnet on the valve body.

Another object of the invention is to provide a bonnet lock which facilitates valve repair by ease of mounting and removal of the lock on and from the valve.

Still a further object of the invention is to combine flexibility in the application of bonnet locks to valves with low cost of manufacture of the locking device.

Other objects, advantages and features of the present invention will become clear from the following detailed description of the preferred embodiment of the invention when read in conjunction with the drawings and appended claims.

BRIEF DESCRIPTION OF THE DRAWINGS

FIG. 6 is a plan view of a second embodiment of a bonnet lock constructed in accordance with the present invention.

FIG. 7 is an end elevational view of a valve showing, in partial cross-section, the bonnet lock of FIG. 6 mounted thereon.

FIG. 8 is a plan view of another embodiment of a bonnet lock constructed in accordance with the present invention.

FIG. 9 is a side elevational view, in partial cross-section, of the bonnet lock of FIG. 8.

FIG. 10 is an end elevational view of a valve showing the bonnet lock of FIGS. 8 and 9 mounted thereon.

DESCRIPTION OF FIGS. 1 THROUGH 5

Figure 1:
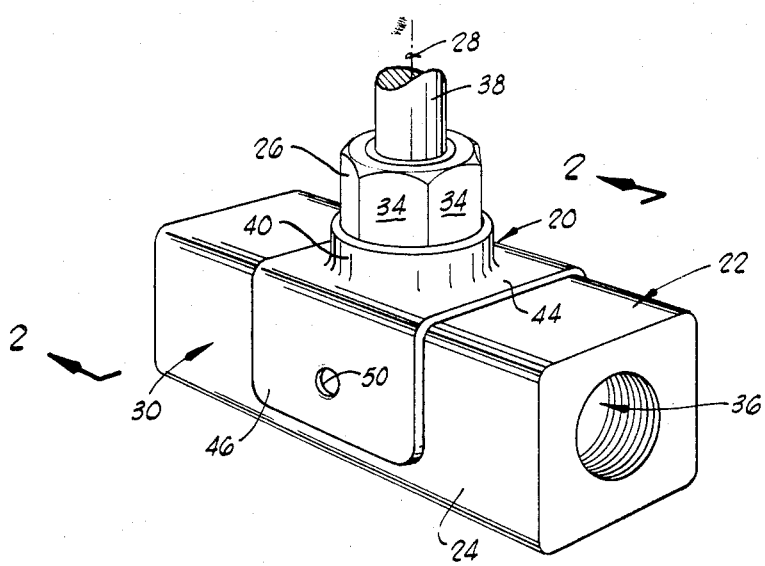
FIG. 1 is a perspective view of a valve with a preferred embodiment of the bonnet lock of the present invention mounted thereon prior to deformation of the bonnet lock to lock the valve bonnet to the valve body.
Figure 2:
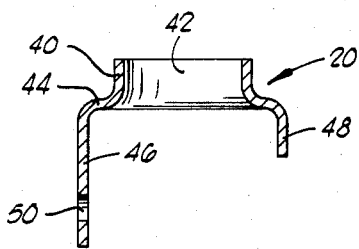
FIG. 2 is a cross-section in end elevation of the bonnet lock shown in FIG. 1, taken along line 2—2 of FIG. 1.
Figure 3:
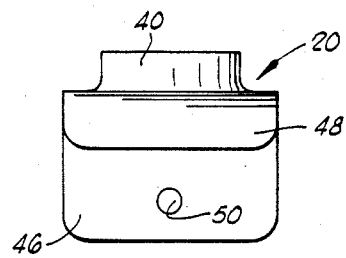
FIG. 3 is a side elevational view of the bonnet lock shown in FIG. 1.

FIGS. 1 through 5 show one preferred embodiment, designated by the reference numeral 20 of the bonnet lock of the present invention. As shown particularly in FIGS. 1, 4 and 5, the bonnet lock 20 is a sheet metal structure, formed by stamping, which mounts on a valve 22, the latter comprising a valve body 24 and a bonnet 26 which screws into the valve body 24 about a screw axis 28. The valve body 24 generally has a pair of opposed sides 30, 32 disposed laterally of the screw axis 28 and a well (not shown) is formed in the valve body 24 about the screw axis 28 to receive a portion of the bonnet 26, the bonnet 26 acting with portions of the valve body 24 about the well to form a valve chamber within the valve body 24. Portions of the well and of the bonnet 26 are threaded so that final assembly of the valve 12 is effected by screwing the bonnet 26 into the well, the bonnet 26 having a plurality of facets 34 formed thereon parallel to the screw axis 28 to facilitate gripping the bonnet for this purpose. Flow through the valve 12 is via a flow passage 36, which intersects the valve chamber in the valve 22, and the flow is controlled by turning a valve stem 38 about the screw axis 28.

In order to provide a full appreciation of the bonnet locking system of the present invention, it will be useful to describe the bonnet lock 20, as well as bonnet locks shown in FIGS. 6 through 10, both in terms of structural features thereof and in terms of locking members which engage portions of the valve 22 to fix the bonnet 26 against rotation in the valve body 24. In particular, the present invention contemplates that the bonnet 26 will be fixed on the valve body 24 via a bonnet lock that includes a first locking member that is shaped to mate with portions of the valve 22 and a second locking member that can be deformed to engage other portions of the valve 22 with the result that the engagement by both members, in cooperation with another characteristic of the bonnet locks of the present invention to be explained below, will secure the bonnet 26 against rotation about the axis 28 on the valve body 24.

In the bonnet lock 20, the second locking member; that is, the locking member that is deformed to engage a portion of the valve 22, is a circular, tubular portion, or simply tube, 40 of the bonnet lock 20. The bore of the tube 40 provides the bonnet lock 20 with an aperture 42 which is the characteristic, referred to above, that cooperates with the locking members to fix the bonnet lock 20 on the valve 22 such that, when the tube 40 is deformed, the bonnet 26 will be unable to rotate above the axis 28. For this purpose, the aperture 42 extends about the bonnet 26 to prevent bending of the bonnet lock 20 once the tube 40 has been deformed to grip the bonnet 26 as will be discussed below. In the bonnet lock 20, the aperture 42 is formed on a diameter sufficient to circumscribe the bonnet 26 so that the bonnet 26 can be inserted through the aperture 42 for a purpose that will become clear below.

In the bonnet lock 20, the second locking member; that is, the locking member that is shaped to mate with a portion of the valve 22, takes the form of a flange 44 for the tube 40, the flange 44 being formed unitarily with the tube 40 via stamping the bonnet lock 20 from sheet metal. Portions of the flange 44 are folded to extend in a direction opposite the extension of the tube 40 from the flange 44 so as to form opposing, depending wings 46, 48 that are shaped to mate with and engage the sides 30 and 32 respectively of the valve body 24. As shown in the drawings, the wings 46, 48 need not extend the same distance from the flange 44; for purposes of the present invention, it will suffice that both wings extend a distance to engage the sides 30, 34 of the valve body 24. As further shown in the drawings and, in particular, in FIG. 1, a small hole 50 is formed through the wing 46 for a purpose to be discussed below.

Figure 4:
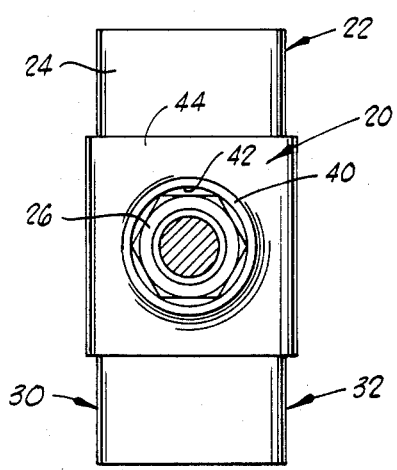
FIG. 4 is a plan view of the valve and bonnet lock of FIG. 1 prior to deformation of the bonnet lock.
Figure 5:
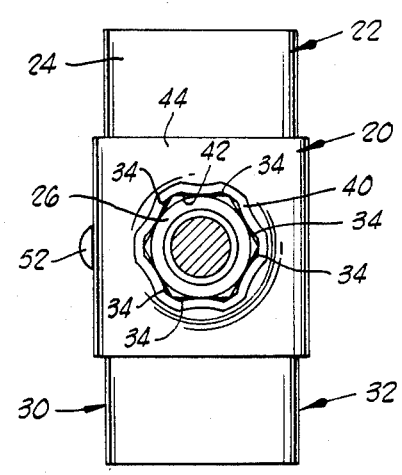
FIG. 5 is a plan view of the valve and bonnet lock similar to FIG. 4 but showing the bonnet lock after deformation to lock the valve bonnet to the valve body.

The above structure of the bonnet lock 20 enables the bonnet lock 20 to be easily mounted on the valve 22 and, conversely, easily removed therefrom as will now be explained with particular reference to FIGS. 1, 4 and 5.

The structure of the bonnet lock 20 to include the aperture 42 on a diameter sufficient to circumscribe the bonnet 26 in conjunction with the construction of the first locking member to include the depending wings 46, 48 permits the bonnet lock 20 to be mounted on the valve 22, in an undeformed state of the bonnet lock 20, by inserting the bonnet 26 through the aperture 42 from between the wings 46, 48. As the bonnet 26 enters the aperture 42, the bonnet lock 20 is positioned about the screw axis 28 such that the wings 46, 48 of the bonnet lock 20 will engage and slide along the sides 30, 32 of the valve body 24 so that the bonnet lock 20 can be seated on the valve 22 with the bonnet extending through the aperture 42 and the wings 46, 48 engaging, and mating with, the sides 30, 32 of the valve body 24 as shown in FIGS. 1 and 4. In this disposition of the bonnet lock 20 on the valve 22; that is, in a disposition including the bonnet lock 20 being in an undeformed state, the bonnet 26 is free to rotate about the axis 28. To prevent such rotation, the use of the bonnet lock 20 comprises a second step of deforming the tube 40; that is, the second locking member of the bonnet lock 20, such that portions of the tube are forced into engagement with the facets 34 on the bonnet 26 as has been shown in FIG. 5. Such step, which is facilitated by the construction of the bonnet lock 20 of sheet metal, can conveniently be carried out either by squeezing the tube 40 with an appropriate gripping tool or by driving portions of the tube inwardly against the facets. In the latter case, the tube 40 can be struck with a hammer or a suitable pin can be placed against the side of the tube 40 and such pin can then be struck with a hammer. In any of these modes of deforming the tube 40, portions of the tube 40 will subsequently engage the facets 34 with the result that the bonnet lock 20 will be fixed against rotation on the bonnet 26 about the screw axis 28. Since the engagement of the wings 46, 48 with the sides 30, 32 of the valve body 24 will prevent relative movement about the axis 28 between the bonnet lock 20 and the valve body 24, the bonnet 26 will be fixed in position about the axis 28 in the above described deformed configuration of the bonnet lock 20 resulting from the deformation of the tube 40 to engage portions of the tube 40 with the facets 34 on the bonnet 26.

In using the bonnet lock 20, it is desirable that a third step be included in the mounting of the bonnet lock 20 on the valve 22. Such step is to secure the bonnet lock to the valve 22 and the hole 50 in the wing 46 is provided for this purpose. In particular, the hole 50 can be located to align with a pre-drilled, threaded, blind hole (not shown) in the valve body 24 or a blind hole can be drilled into the side of the valve body 24, and threaded, following the mounting of the bonnet lock 20 on the valve 22. A screw 52 (FIG. 5) is then inserted through the hole 50 in the wing 46 and screwed into the blind hole in the valve body 24 to secure the bonnet lock 20 to the valve 22.

The removal of the bonnet lock 20 from the valve 22, to permit removal of the bonnet 26 from the valve body 24, is facilitated by the construction of the bonnet lock 20 of sheet metal and the above-described mode of mounting the bonnet 20 on the valve 22. In particular, these factors enable the bonnet 26 to be freed for rotation about the axis 28 by prying the wings 46, 48 away from the sides 30, 32 of the valve body 24 so that the bonnet 26 can be unscrewed from the valve body 24 with the bonnet lock 20 remaining mounted on the bonnet 26. The bonnet lock 20 can then be easily removed from the bonnet 26 by slitting the bonnet lock 20 or by driving the bonnet lock 20 off one end of the bonnet 26.

DESCRIPTION OF FIGS. 6 AND 7

Referring now to FIGS. 6 and 7, shown therein is a second embodiment, designated by the reference numeral 20a, of a bonnet lock constructed in accordance with the present invention. As in the case of the bonnet lock 20, the first locking member of the bonnet lock 20a is comprised of a pair of wings 46a, 48a which engage and mate with the sides 30a and 32a of the valve body 24a of a valve 22a and other portions of the bonnet lock 20a are deformed to engage the facets 34a of the bonnet 26a of the valve 22a. It is comtemplated that the valve 22a is substantially identical to the valve 22, the major difference being that the end of the bonnet 26a opposite the end thereof that screws into the valve body 24a is champfered as at 54 in FIG. 7. In addition, a groove 56 can be formed circumferentially about the bonnet 26a to provide an alternative method of securing the bonnet lock 20a to the valve 22a as will be discussed below.

In the bonnet lock 20a, the wings 46a, 48a are disposed in a spaced, opposing relation by a plate 58 to which the wings 46a, 48a are attached, the wings 46a, 48a depending from opposite sides of the plate 58 as shown in FIG. 7. The aperture, designated 42a in FIG. 6, which is provided for the bonnet of the valve, is formed through the plate 58 in the bonnet lock 20a and portions of the plate 58 adjacent the aperture 42a form the second locking member of the bonnet lock 20a; that is, the portion of the bonnet lock 20a that is deformed to cause the bonnet lock 20a to hold the bonnet 26a in position on the valve body 24a. In order that these portions of the bonnet lock 20a can be deformed to engage the facets 34a, the aperture 42a is circular and is formed on a diameter insufficient to circumscribe the bonnet 26a so that deformation of portions of the bonnet lock 20a constituting the second locking member thereof will occur in the mounting of the bonnet lock 20a on the valve 22a.

The mounting of the bonnet lock 20a on the valve body 24a is similar to the mounting of the bonnet lock 20 on the valve 22 in that such mounting includes the positioning of the bonnet lock 20a on the valve 22a such that the wings 46a, 48a engage the opposed sides 30a, 32a of the valve 24a. The aperture 42a is aligned with the screw axis 28a in this positioning of the bonnet lock 20a on the valve 28a by engaging the aperture 42a with the champfer 54 on the bonnet 26a. The mounting of the bonnet lock 20a on the valve 22a, to secure the bonnet 26a against rotation, can then be effected by driving the plate 58 into an abutting relation with the valve body 24a so that portions of the plate 58 adjacent the aperture 42a will be deformed upwardly about the bonnet 26a as shown in FIG. 7. Such mounting of the bonnet lock 20a on the valve 22a can be readily accomplished by placing a length of pipe about the bonnet 26a, after positioning of the bonnet 20a on the valve 22a as described above, and then striking the end of the pipe with a hammer.

The bonnet lock 20a can be secured to the valve 22a in the same manner that the bonnet lock 20 is secured to the valve 22; that is, via a screw that passes through a hole in the wing 46a and threads into a blind hole in the side of the valve body 24a, or, alternatively, the groove 56 can be used for this purpose. In the latter case, a split snap ring 60 is placed on the champfered portion 54 of the bonnet 26a, subsequent to the mounting of the bonnet lock 20a on the valve 22a, and driven toward the valve body 24a so as to snap into the groove 56. Removal of the bonnet lock 20a is carried out in substantially the same manner that the bonnet lock 20 is removed from the valve 22; that is, the wings 46a, 48a are initially pryed away from the sides of the valve body 24a to free the bonnet 26a for rotation, so that the bonnet 26a can be removed from the valve body 24a, and the bonnet lock 20a is subsequently cut or driven from the bonnet 26a.

DESCRIPTION OF FIGS. 8 THROUGH 10

Referring now to FIGS. 8 through 10, shown therein and designated by the reference numeral 20b is a third embodiment of the bonnet lock of the present invention. Like the bonnet lock 20, the bonnet lock 20b includes a tubular portion, or tube, 40b which fits over the bonnet 26b of a valve 22b, as shown in FIG. 10, so that the bore of the tube provides the bonnet receiving aperture, designated 42b in FIGS. 8 and 9, of the bonnet lock 20b. In the bonnet lock 20b, the tube 40b constitutes the first locking member of the bonnet lock; that is, the portion of the bonnet lock which is pre-shaped to engage and mate with portions of the valve 22b. To this end, the tube 40b of the bonnet lock 20b has a polygonal cross-section, as best seen in FIG. 8, corresponding to the polygonal outer periphery of the bonnet 26b formed by the angular relationship between facets 34b thereon. The second locking member, for the bonnet lock 20b is a circular flange 62 that is formed unitarily with the tube 40b, at one end thereof, and can be bent to engage the sides 30b, 32b of the valve body 24b.

The mounting of the bonnet lock 20b on the valve 22b is similar to the mounting of the bonnet lock 20 on the valve 22. In particular, the bonnet 26b of the valve 22b is inserted through the flanged end of the tube 42b so that the facets 34b will engage and mate with the inner periphery of the tube 40b and the flange 62 will abut the valve body 24b. Thus, in either case, the bonnet lock 20 or 20b is placed on the valve 22 or 22b so that the first locking member (the wings 46 and 48 for the bonnet lock 20 and the tube 40b for the bonnet lock 20b) will engage surfaces on the valve that are disposed parallel to the screw axis of the bonnet into the valve body.

Such surfaces are the sides 30, 32 of the valve body 24 for the valve 22 and are the facets 34b of the bonnet 26b for the valve 22b. The second locking member (the tube 40 for the bonnet lock 20 and the flange 62 for the bonnet lock 20b) is then deformed to engage surfaces on the other of the bonnet and the valve body. In the case of the valve 22, such surfaces are the facets 34 as described above. In the case of the valve 22b, these surfaces are the sides 30b, 32b of the valve body 24b and the deformation of the second locking member; that is, the flange 60 for the bonnet lock 20b, can be conveniently effected by hammering portions of the flange 60 into a folded condition shown in FIG. 10 in which such portions will form depending wings 46b, 48b that engage the sides of the valve body 24b.

The bonnet lock 20b can be secured to the valve 22b by either of the two methods described above; that is, via screw that passes through a hole in the wing 46b or via a snap ring that is disposed in a circumferential groove about the bonnet 26b. Removal of the bonnet lock 20b is accomplished by removing the securing means and lifting the bonnet lock 20b from the bonnet 26b.

It is clear that the present invention is well adapted to carry out the objects and attain the ends and advantages mentioned as well as those inherent therein. While presently preferred embodiments of the invention have been described for purposes of this disclosure, numerous changes may be made which will readily suggest themselves to those skilled in the art and which are encompassed within the spirit of the invention disclosed and as defined in the appended claims.

What is claimed is:

1. A method for fixing a bonnet to a valve body into which the bonnet screws between opposed sides of the valve body, said bonnet having a plurality of angularly related facets formed thereon parallel to the screw axis of the bonnet into the valve body, comprising the steps of:

engaging one portion of a sheet metal structure with the sides of the valve body so as to fix the position of the sheet metal structure with respect to the valve body; and then deforming one other portion of the sheet metal structure to engage the facets on the bonnet whereby the sheet metal structure prevents relative movement of the bonnet about the screw axis of the bonnet into the valve body after said deformation.

2. The method of claim 1 wherein said one portion of the sheet metal structure comprises two wings depending from said one other portion of the sheet metal structure and spaced apart to engage the sides of the valve body; wherein said one other portion of the sheet metal structure comprises a circular tube sized and positioned with respect to said wings to fit about the bonnet when the wings are engaged with the sides of the valve body; wherein the step of engaging one portion of the sheet metal structure with the facets on the bonnet is further characterized as the step of placing said tube about the bonnet with said wings depending from the tube to engage the sides of the valve body; and wherein the step of deforming one other portion of the sheet metal structure is further characterized as the step of crimping said tube into engagement with the bonnet.

3. The method of claim 1 wherein said one portion of the sheet metal structure comprises two wings depending from said one other portion of the sheet metal structure and spaced apart to engage the sides of the valve body; wherein said one other portion of the sheet metal structure is characterized as being a plate having an aperture formed therethrough on a diameter insufficient to circumscribe the bonnet, said plate connecting said wings and said aperture positioned to axially align with said bonnet when said wings are engaged with the sides of the valve body; wherein the step of engaging one portion of the sheet metal structure with the facets on the bonnet is further characterized as engaging the sides of the valve body with said wings while axially aligning said aperture with the bonnet; and wherein the step of deforming one other portion of the sheet metal structure is further characterized as the step of forcing said aperture over the bonnet of the valve.

4. A method for fixing a bonnet to a valve body into which the bonnet screws between opposed sides of the valve body, said bonnet having a plurality of angularly related facets formed thereon parallel to the screw axis of the bonnet into the valve body, comprising the steps of:

engaging one portion of a sheet metal structure with the facets on the bonnet so as to fix the position of the sheet metal structure with respect to the bonnet; and then deforming one other portion of the sheet metal structure to engage the sides of the valve body, whereby the sheet metal structure prevents relative movement of the bonnet about the screw axis of the bonnet into the valve body after said deformation.

5. The method of claim 4 wherein said one portion of the sheet metal structure is characterized as comprising a tube of polygonal cross section to matingly fit on the bonnet; wherein said one other portion of the sheet metal structure is characterized as being a flange extending radially from one end of said tube; wherein the step of engaging said one portion of the sheet metal structure with the facets of the bonnet is further characterized as being the step of placing said tube on the bonnet such that said flange engages the valve body; and wherein the step of deforming one other portion of the sheet metal structure is further characterized as being the step of bending portions of said flange into engagement with the sides of the valve body.

6. A method for fixing a bonnet to a valve body into which the bonnet screws between opposed sides of the valve body, said bonnet having a plurality of angularly related facets formed thereon parallel to the screw axis of the bonnet into the valve body, comprising the steps of:

placing a sheet metal structure having a tubular portion formed thereon on the valve such that the bonnet extends through said tubular portion; and then deforming the sheet metal structure such that said tubular portion and one other portion of the sheet metal structure will substantially mate with the bonnet and sides of the valve body, respectively.

7. The method of claim 6 further comprising the step of securing the sheet metal structure to the valve.

8. The method of claim 6 wherein said tubular portion of the sheet metal structure is characterized as having an undeformed circular cross-section and said one other portion of the sheet metal structure is characterized as comprising wings extending from a flange formed on the tubular portion in a direction opposite the extension of the tubular portion from said flange; wherein the step of placing the sheet metal structure on the valve is further characterized as inserting the bonnet through the tubular portion so as to engage said wings with the sides of the valve body; and wherein the step of deforming the sheet metal structure is further characterized as crimping the tubular portion into engagement with facets of the bonnet.

9. The method of claim 8 further comprising the step of securing the sheet metal structure to the valve.

10. The method of claim 6 wherein said tubular portion of the sheet metal structure is characterized as having a polygonal cross-section to mate with the facets of the bonnet and said one other portion of the sheet metal structure is a circular flange extending radially from one end of the tubular portion; wherein the step of placing the sheet metal structure on the valve is further characterized as inserting the bonnet through said tubular portion such that the flange abuts the valve body; and wherein the step of deforming the sheet metal structure is further characterized as bending portions of said flange into engagement with the opposed sides of the valve body.

11. The method of claim 10 further comprising the step of securing the sheet metal structure to the valve.

12. A method for fixing a bonnet to a valve body into which the bonnet screws between opposed sides of the valve body, said bonnet having a plurality of angularly related facets formed thereon parallel to the screw axis of the bonnet into the valve body, comprising the steps of:

engaging the opposed sides of the valve body with depending wings of a sheet metal structure, said wings extending substantially perpendicularly to a central portion of the structure and the central portion having a aperture formed therethrough on a diameter insufficient to circumscribe the bonnet;

aligning the aperture with the bonnet; and then forcing the bonnet through the aperture to deform portions of the central portion of the sheet metal structure into substantially mating engagement with the facets of the bonnet.

13. The method of claim 12 further comprising the step of securing the sheet metal structure to the valve.

* * * * *